United States Patent [19]

Carroll et al.

[11] Patent Number: 5,484,217
[45] Date of Patent: Jan. 16, 1996

[54] RESTORABLE BREAKAWAY POST

[75] Inventors: Frank E. Carroll; George W. Frejd, both of Woodstock, Ill.

[73] Assignee: Decks, Inc., Woodstock, Ill.

[21] Appl. No.: 275,794

[22] Filed: Jul. 15, 1994

[51] Int. Cl.⁶ .................................................. F16D 9/00
[52] U.S. Cl. ..................... 403/2; 404/10; 52/98; 248/548
[58] Field of Search ............................ 256/1, DIG. 5, 256/65, 68, 69; 404/10; 403/2, 341, 300, 301, 302, 354; 52/98; 40/608, 606; 248/548, 900, 354.1; 285/24

[56] References Cited

U.S. PATENT DOCUMENTS

| | | | |
|---|---|---|---|
| 3,623,286 | 11/1971 | Parduhn | 404/10 X |
| 3,797,948 | 3/1974 | Weininger | 403/354 X |
| 3,820,906 | 6/1974 | Katt | 404/10 X |
| 3,912,404 | 10/1975 | Katt | 403/2 |
| 3,912,405 | 10/1975 | Katt | 403/2 |
| 4,126,403 | 11/1978 | Sweeney et al. | 403/2 |
| 4,236,843 | 12/1980 | Chisholm | 403/2 |
| 4,343,567 | 8/1982 | Sarver et al. | . |
| 4,759,161 | 7/1988 | Kucyk, Jr. et al. | 404/10 X |
| 5,004,366 | 4/1991 | Simmons | 52/98 X |
| 5,160,111 | 11/1992 | Hugron | 403/2 X |
| 5,214,886 | 6/1993 | Hugron | 403/2 X |

FOREIGN PATENT DOCUMENTS 2193521  2/1988  United Kingdom .................... 404/10

OTHER PUBLICATIONS

Advertisement entitled: "How The New Minute Man Breaks Away From The Field", 3 pages, (1990), Marion Steel Co., 912 Cheney Ave., Marion, Ohio 43302.
Advertisement of: "Rural Mailbox Mounting Posts", of Steel City Corp., 190 N. Meridian Rd., Youngstown, Ohio 44501.

*Primary Examiner*—Eric K. Nicholson
*Assistant Examiner*—Harry C. Kim
*Attorney, Agent, or Firm*—Speckman, Pauley & Fejer

[57] ABSTRACT

A restorable breakaway post having a base post and a breakaway post which are connected with a breakable splice plate. The position of the base post is fixed with respect to ground or another suitable structure. A flexible member has opposing ends secured with respect to the base post and the breakaway post. Upon an impact force applied to the breakaway post, the splice plate shears and thus allows the breakaway post to move away from the base post. Under such impact force, the flexible member retains the breakaway post in a relatively close position to the base post. The broken splice plate can be easily replaced to restore the breakaway post to its initial condition.

19 Claims, 4 Drawing Sheets

RESTORABLE BREAKAWAY POST

BACKGROUND OF THE INVENTION

1. Field of the Invention

This invention relates to a breakaway post that can be used for mounting signs, highway reflectors, mailboxes and the like. A breakaway post is attached to a base post in such a manner that upon impact to the breakaway post, a splice plate fractures and allows the breakaway post to move away from the base post. The splice plate can be replaced to restore the sign to its initial position.

2. Description of Prior Art

Highway signs and highway reflectors are typically displayed by mounting them on a post which is driven into the ground. When such conventional posts are damaged by a vehicle, snowplow or other destructive acts, the bent or otherwise damaged post must be removed and a new post must be repositioned into the ground. Such reconstruction wastes the original post material and requires removal of the sign or reflector from the damaged post, as well as replacement of such sign or reflector to a new post. Furthermore, such reconstruction requires that the new post be driven into the ground. With a one-piece conventional post design, the post is normally driven with forceful blows delivered from a relatively high location, thus making it awkward for a worker to drive the new post into the ground.

Other conventional designs include a replaceable post mounted to a permanent base. For example, U.S. Pat. No. 4,343,567 teaches a self-erecting roadway marking post which has a metal anchor tube that is driven into the ground. The anchor tube forms a cavity which receives a lower end portion of an elongated cylindrical flexible marking tube, which is preferably constructed of a resilient plastic material. The '567 patent teaches a relatively elaborate arrangement of mechanical elements which enable the marking post to be restored to an initial condition after encountering a damaging impact force, without replacing the anchor tube. Resilient or flexible posts tolerate relatively small impact forces without fracturing; however, wind forces tend to vibrate, shake or sway such flexible posts and thereby distract motorists. It is to be noted that in cold weather, plastic posts become brittle and more susceptible to fracture.

Mailbox posts are often prone to impact forces from snowplows, mail delivery vehicles and the like. One particular mailbox post, marketed by Steel City Corp., in Youngstown, Ohio, includes a metal anchor that is driven into the ground. A wood post is attached to a bracket formed by the metal anchor. Such company also markets a metal post that has an adjustable height as a result of a two-piece post structure. Such metal anchors are constructed of square tubing and have a pointed bottom portion for driving the metal anchor into the ground.

Even in view of conventional post designs, it is apparent that there is a need for a breakaway post that after destructive impact can be quickly restored to its initial position without replacing the post itself. It is also apparent that there is a need for a breakaway post that can be easily and economically replaced in the field without using heavy or expensive equipment or tools.

SUMMARY OF THE INVENTION

It is thus one object of this invention to provide a breakaway post that can be easily restored to its initial position, after experiencing a destructive impact force, without replacing the post itself.

It is another object of this invention to provide a breakaway post that has an inexpensive member that fractures under an impact force applied to the post.

It is another object of this invention to provide a breakaway post wherein the post remains intact after experiencing the destructive impact force.

It is still another object of this invention to provide a breakaway post that can be quickly replaced in the field, without the need for special equipment or tooling.

The above and other objects of this invention are accomplished with a breakaway post that has two main portions, a base post and a breakaway post. The base post is fixed in a particular position. For example, the base post can be implanted or driven into the ground, or it can be secured to a structure.

In one preferred embodiment according to this invention, the breakaway post is spaced from and forms a gap with respect to the base post. A longitudinal axis of the base post is preferably aligned with a longitudinal axis of the breakaway post, so that the overall post construction has an integral appearance. By adequately spacing the breakaway post far enough from the base post, the head of a hammer tool can be inserted within the gap formed between the base post and the breakaway post. Such hammer tool can be used from a convenient position to drive the base post into the ground.

A breakable splice plate is used to mount the breakaway post with respect to the base post. The breakable splice plate is preferably constructed of an acrylic material, or another suitable material that will fracture before the breakaway post fractures or permanently bends. The splice plate can have a fracture groove cut into at least one face surface to provide a calculated area or location at which fracture will occur when exposed to an impact force.

Suitable fasteners, such as an externally threaded bolt, are used to secure the splice plate with respect to both the base post and the breakaway post. Each fastener is preferably positioned within a through hole or a through slot within the splice plate. The opposite end of the fastener can be secured to either the breakaway post or the base post in any suitable manner known to those skilled in the art.

A flexible member, such as a cable, band, strap or the like, has one end secured with respect to the base post and an opposite end secured with respect to the breakaway post. It is apparent that such flexible member can be secured in any suitable manner known to those skilled in the art.

When an impact force is applied to the breakaway post, the splice plate fractures and thus allows the breakaway post to separate from its mounted position with respect to the base post and to move away from the base post, such as toward the ground. The flexible member is used to retain the breakaway post in the general location of the base post as the breakaway post moves away from the base post. To restore the breakaway post to its initial position, the damaged splice plate is removed and a new splice plate is simply fastened into the initial position. It is apparent that with removable fasteners the breakaway post can be quickly and economically restored to its initial position after experiencing a destructive impact force.

BRIEF DESCRIPTION OF THE DRAWINGS

The above-mentioned and other features and objects of this invention will be better understood from the following detailed description taken in conjunction with the drawings, wherein.

DETAILED DESCRIPTION OF PREFERRED EMBODIMENTS

According to one preferred embodiment of this invention, the restorable breakaway post comprises two separate structural members, base post 20 and breakaway post 30. The position of base post 20 is fixed. For example, base post 20 can be implanted or driven into the ground, or base post 20 can be mounted or secured with respect to a structural member, such as a curb, a railing or another suitable construction or frame member.

Figure 1:
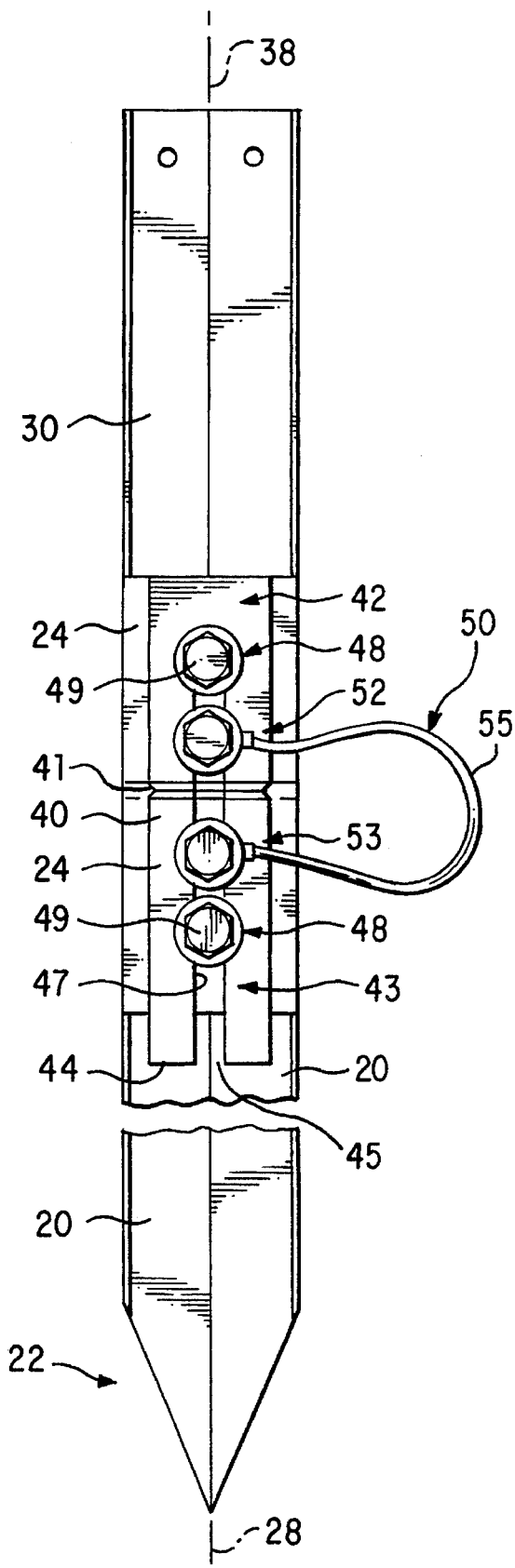
FIG. 1 is a front view of a breakaway post having an L-shaped cross section, according to one preferred embodiment of this invention.
Figure 2:
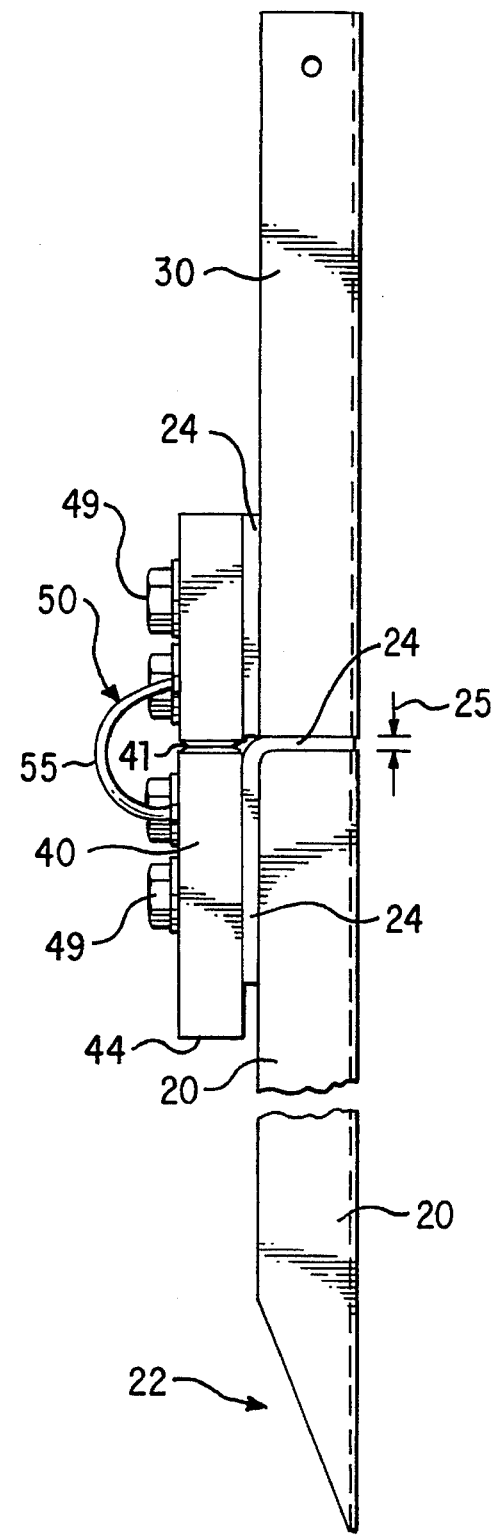
FIG. 2 is a side view of the breakaway post shown in FIG. 1.
Figure 3:
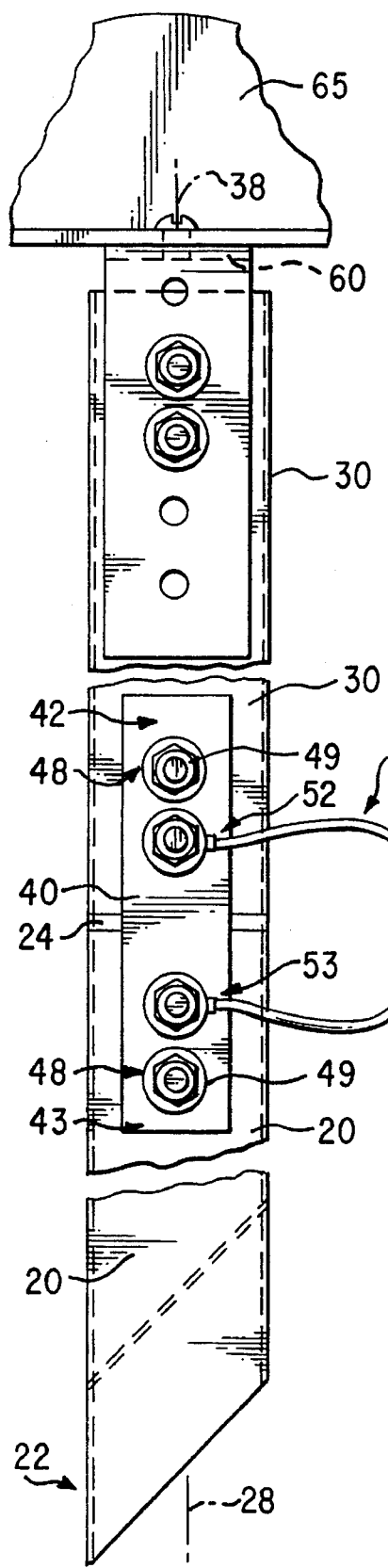
FIG. 3 is a front view of a breakaway post having a square tube cross section, according to another preferred embodiment of this invention.
Figure 4:
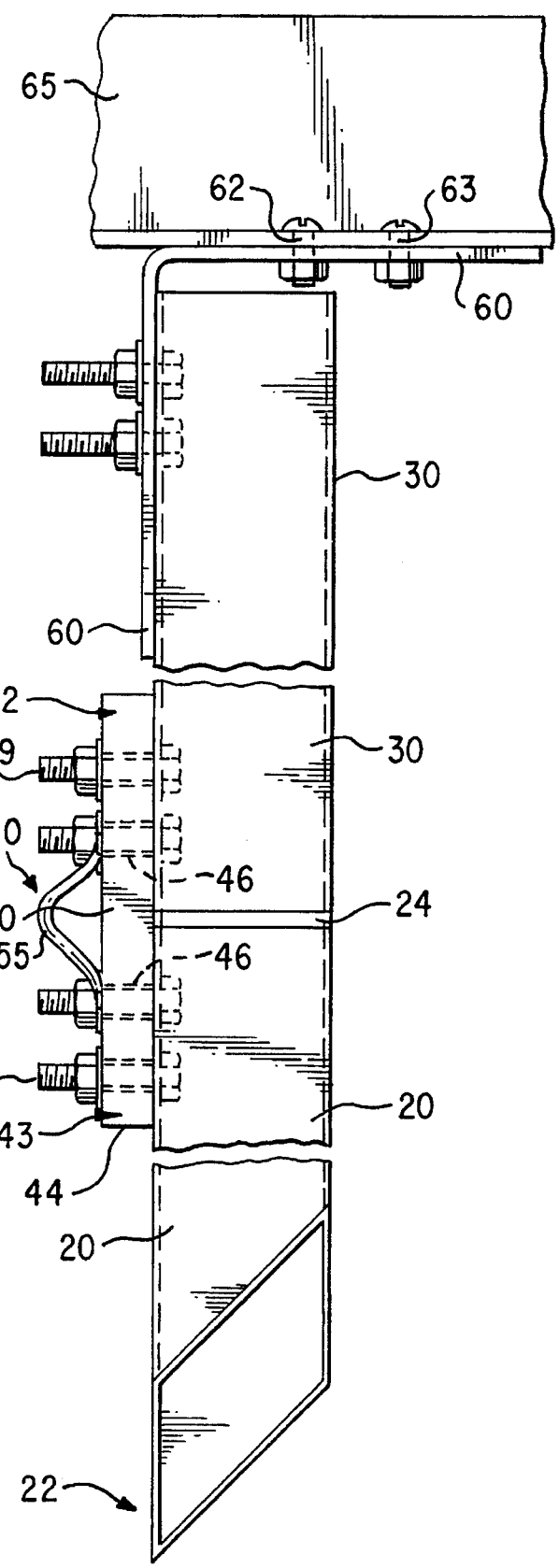
FIG. 4 is a side view of the breakaway post shown in FIG. 3.

In certain preferred embodiments according to this invention, as shown in FIGS. 1–4 and 7, base post 20 has tip portion 22 which is pointed or otherwise suitably shaped for driving base post 20 into the ground. It is also apparent that base post 20 can have any suitable cross-sectional shape that accommodates the method in which base post 20 is fixed in a particular position. As shown in FIGS. 1 and 2, base post 20 and breakaway post 30 each have a general L-shaped cross section, and as shown in FIGS. 3 and 4 each have a square tube cross section.

Figure 6:
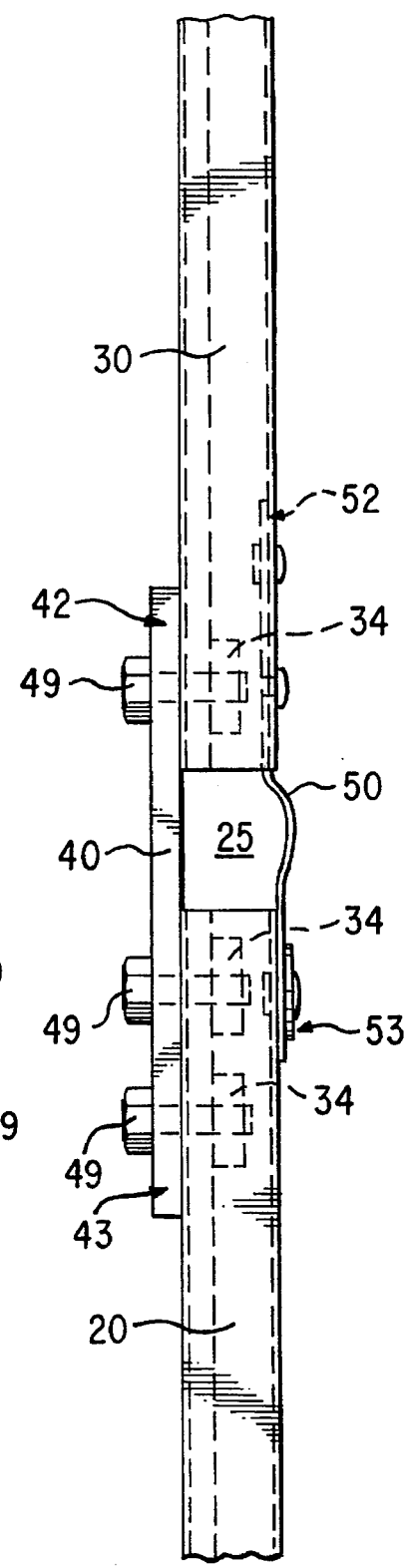
FIG. 6 is a side view of the breakaway post shown in FIG. 5.
Figure 7:
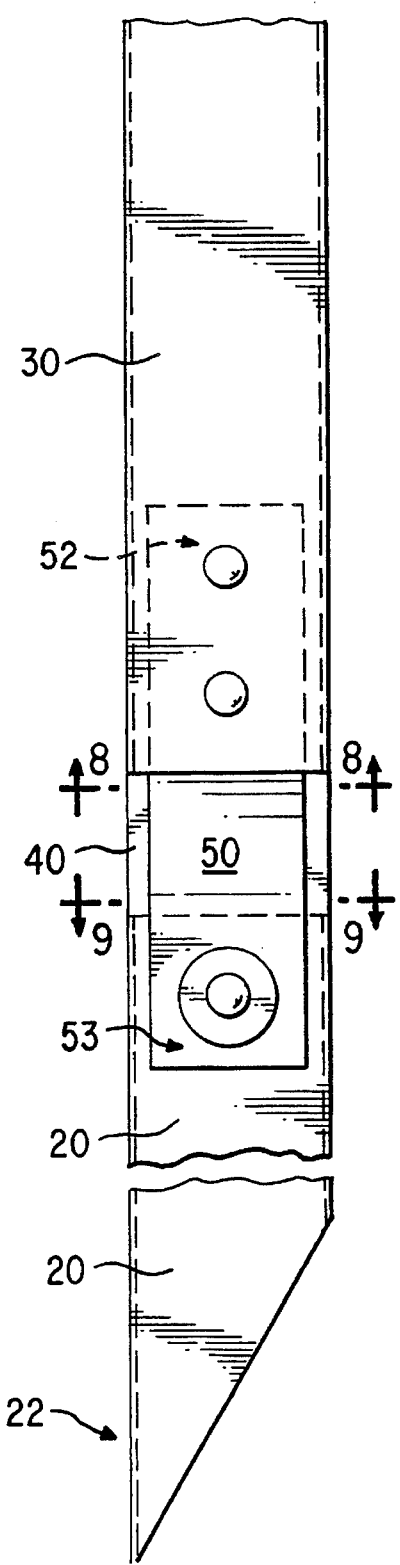
FIG. 7 is a rear view of the breakaway post shown in FIGS. 5 and 6.
Figure 8:
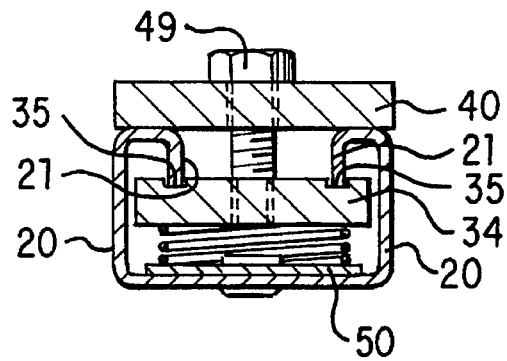
FIG. 8 is a cross-sectional view taken along line 8—8, as shown in FIG. 7.
Figure 9:
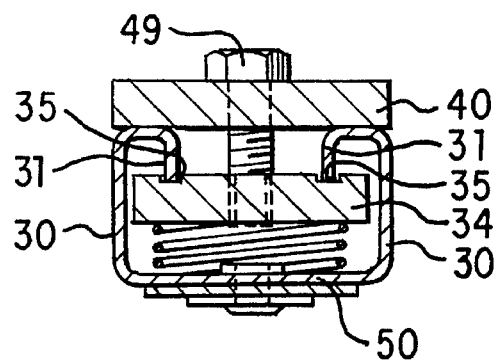
FIG. 9 is a cross-sectional view taken along line 9—9, as shown in FIG. 7.
Figure 10:
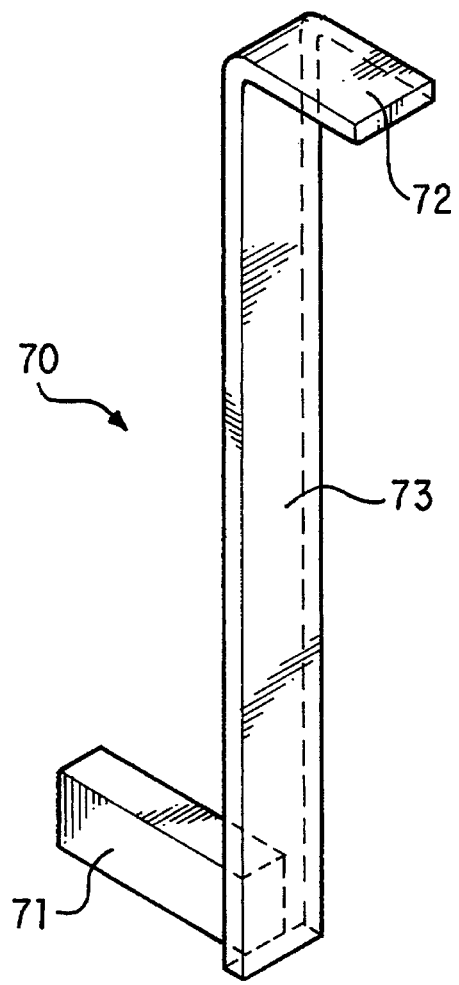
FIG. 10 is a perspective view of a hammer tool, according to one preferred embodiment of this invention.

Breakaway post 30 is preferably spaced at a given distance from base post 20, as shown in FIGS. 2 and 6. Gap 25 is formed between adjacent facing ends of base post 20 and breakaway post 30. Gap 25 is preferably large enough to accommodate head 71 of hammer tool 70, which is shown in FIG. 10. Hammer tool 70 comprises strike flange 72 and extension arm 73. Head 71 fits within gap 25, preferably far enough so that extension arm 73 abuts or is closely adjacent breakaway post 30. With such arrangement, a user can easily grasp and hold hammer tool 70 against breakaway post 30, with stability. A relatively tight fit with little play between head 71 and both base post 20 and breakaway post 30 will result in greater stability of hammer tool 70, when in use. By delivering an impact force or blow to strike flange 72 when hammer tool 70 is mounted within gap 25, the force is transferred through head 71 to the upper portion of base post 20. In one preferred embodiment according to this invention, as shown in FIGS. 1–4, the upper portion of base post 20 is strengthened with any suitable material, such as steel plate 24 or the like.

According to one preferred embodiment of this invention, splice plate 40 is used to secure breakaway post 30 with respect to base post 20. The material and design of splice plate 40 is preferably selected so that upon impact, splice plate 40 will shear before either breakaway post 30 or base post 20 shears or bends. In one preferred embodiment according to this invention, as clearly shown in FIGS. 1 and 2, splice plate 40 has fracture groove 41 molded, etched, cut or otherwise formed within at least one suitable face surface. If splice plate 40 is intended to fracture regardless of the direction of the impact force, then splice plate 40 should have fracture groove 41 on all face surfaces that form a periphery of splice plate 40. Fracture groove 41 provides a designed location at which fracture will occur. It is apparent that other material selections or design features apparent to those skilled in the art can be used to calculate the location at which fracture of splice plate 40 will occur. In one preferred embodiment, splice plate 40 is constructed of an acrylic material or another similar or suitable material. The material selection of splice plate 40 will depend upon the design and intended use of base post 20 and breakaway post 30.

Securement means are used to secure end portion 42 of splice plate 40 with respect to base post 20. Such securement means can also be used to secure end portion 43 of splice plate 40 with respect to breakaway post 30.

In one preferred embodiment according to this invention, the securement means comprise splice plate 40 having at least two through holes 46. At least two fasteners 48 each extend through a corresponding through hole 46. In one preferred embodiment according to this invention, fastener 48 comprises an externally threaded bolt 49. Each fastener 48 is tightened to secure splice plate 40 with respect to both base post 20 and breakaway post 30.

In preferred embodiments according to this invention, as shown in FIGS. 1–4, two fasteners 48 are used to secure splice plate 40 with respect to base post 20, and two fasteners 48 are used to secure splice plate 40 with respect to breakaway post 30. By using four total fasteners 48, it is apparent that the overall structure formed by base post 20, breakaway post 30 and splice plate 40 will remain rigid and will act as an integral member.

In another preferred embodiment according to this invention, as shown in FIG. 1, splice plate 40 has at least one through slot 47 through which at least two, preferably four, fasteners 48 extend. In the preferred embodiments according to this invention as shown in FIG. 1, through slot 47 extends all of the way to and forms channel opening 45 at side face 44 of splice plate 40. In such preferred embodiments according to this invention, splice plate 40 is easily replaced by loosening fasteners 48 and, for example, quickly sliding splice plate 40 between the heads of bolts 49 and adjacent sides of base post 20 and breakaway post 30. Such preferred embodiments of splice plate 40 enable a field crew to quickly detach a fractured splice plate 40 and reinstall a new splice plate 40.

According to another preferred embodiment of this invention, as shown in FIGS. 5–9, base post 20 and/or breakaway post 30 have a cross section with an overall U-shape. Spring-loaded nuts 34 can be used to tighten bolts 49. As bolt 49 is tightened with respect to spring-loaded nut 34, grooves 35 within spring-loaded nuts 34 engage with flanges 21 or 31 of either base post 20 or breakaway post 30, respectively, and thus tighten base post 20 or breakaway post 30 with respect to splice plate 40. It is apparent that spring-loaded nuts 34 can be slid within the opening of either base post 20 or breakaway post 30, as shown in FIGS. 5–9, to provide floating positioning of bolts 49, which is particularly useful when splice plate 40 has through slot 47, and which is particularly useful for adjusting through holes for accommodating signs, reflectors or the like, having various designs.

Figure 5:
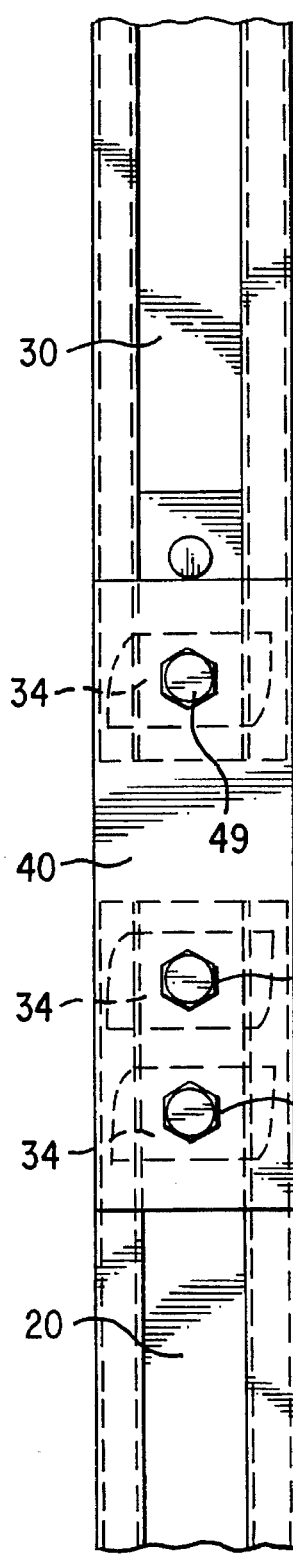
FIG. 5 is a front view of a breakaway post having a U-shaped cross section, with a strap secured between the breakaway post and a base post, according to another preferred embodiment of this invention.

Elongated flexible member 50 is used to retain breakaway post 30 relatively close to base post 20 when breakaway post 30 is forced away from base post 20. In preferred embodiments according to this invention, as shown in FIGS. 1–4, flexible member 50 comprises cable 55. It is apparent that any other suitable flexible member, such as a strap as shown in FIGS. 5 and 6, a band, a spring or the like, can be used in lieu of cable 55. Attachment means are used to attach or secure end portion 53 with respect to base post 20, and also to attach or secure end portion 52 with respect breakaway post 30. In one preferred embodiment according to this invention, end portions 52 and 53 can each have a washer secured to cable 55, for example, as shown in FIGS. 1–4. Such washer can be positioned over fastener 48 or bolt 49. Preferably, opposite ends of flexible member 50 are secured to the two closest fasteners 48 between base post 20 and breakaway post 30, as clearly shown in FIGS. 1 and 3. Such relatively close positioning reduces the amount of material necessary for flexible member 50.

In another preferred embodiment according to this invention, as shown in FIGS. 3 and 4, mounting means are used to mount baseplate 60 with respect to breakaway post 30. Upon an impact force applied to baseplate 60, such mounting means allow baseplate 60 to pivot with respect to breakaway post 30. In one preferred embodiment according to this invention, such mounting means comprise fasteners 62 and 63. One of fasteners 62 and 63 preferably has a higher shear fracture point than the shear fracture point of the other of fasteners 62 and 63. For example, fastener 62 can be constructed of a steel or metal material and fastener 63 can be constructed of a plastic material or another material that has a lower shear fracture point than the material selected for fastener 62. It is also apparent that fasteners 62 and 63 can have different shear fracture points by varying the diameters of the bolts, or by cutting a groove into one of the fasteners in order to form a concentrated stress area at which fracture will occur.

Structure 65, such as a mailbox, can be mounted to baseplate 60. Thus, if structure 65 is struck or an impact force is applied, the weaker of fasteners 62 and 63 will shear and thus allow baseplate 60 to rotate about the stronger of fasteners 62 and 63, which preferably remains intact. For example, if a mailbox is struck with a vehicle or is vandalized by being struck with a baseball bat, the weaker of fasteners 62 and 63 will shear and allow structure 65 and baseplate 60 to rotate with respect to breakaway post 30. In such instance, the sheared fastener can be replaced to restore structure 65 to its initial position. It is apparent from the drawings that fastener 62 is spaced at a distance with respect to fastener 63.

Although longitudinal axis 28 of base post 20 is preferably aligned with longitudinal axis 38 of breakaway post 30, as shown in FIG. 1, it is apparent that longitudinal axis 28 can be offset with respect to longitudinal 38. For example, base post 20 and breakaway post 30 can be mounted on opposite sides of splice plate 40. However, the arrangement where longitudinal axis 28 is aligned with longitudinal axis 38 advantageously provides a breakaway post that has an overall integral appearance.

Although base post 20 and breakaway post 30 are preferably constructed of metal, it is apparent that such elements can be constructed of any other suitable material, depending upon the intended use.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A restorable breakaway post comprising:

a base post;

first means for fixing a position of said base post;

a breakaway post, said breakaway post spaced from said base post;

a breakable splice plate;

second means for securing one plate end portion of said breakable splice plate with respect to said base post and for securing an opposite plate end portion of said breakable splice plate with respect to said breakaway post;

an elongated flexible member;

third means for securing one member end portion of said flexible member with respect to said base post and for securing an opposite member end portion of said flexible member with respect to said breakaway post; and fourth means for fixedly mounting a baseplate with respect to said breakaway post, and upon an impact force applied to said baseplate said fourth means allowing said baseplate to pivot with respect to said breakaway post.

2. A restorable breakaway post according to claim 1 wherein said first means comprise said base post having a tapered tip portion.

3. A restorable breakaway post according to claim 1 wherein said position of said base post is fixed with respect to ground.

4. A restorable breakaway post according to claim 1 wherein a base longitudinal axis of said base post is generally aligned with a breakaway longitudinal axis of said breakaway post, and adjacent facing ends of said breakaway post and said base post are spaced from each other.

5. A restorable breakaway post according to claim 1 wherein said breakable splice plate is of an acrylic material.

6. A restorable breakaway post according to claim 1 wherein said second means comprise said splice plate having at least two through holes, two fasteners, and each said fastener extending through a corresponding through hole of said at least two through holes.

7. A restorable breakaway post according to claim 6 wherein one fastener of said fasteners is secured with respect to said splice plate and said breakaway post, and another fastener of said fasteners is secured with respect to said splice plate and said base post.

8. A restorable breakaway post according to claim 6 wherein said fasteners each comprises an externally threaded bolt.

9. A restorable breakaway post according to claim 1 wherein said second means comprise said splice plate having at least one through slot, two fasteners, and each said fastener extending through a corresponding through slot of said at least one through slot.

10. A restorable breakaway post according to claim 9 wherein one fastener of said fasteners is secured with respect to said splice plate and said breakaway post, and another fastener of said fasteners is secured with respect to said splice plate and said base post.

11. A restorable breakaway post according to claim 9 wherein said fasteners each comprises an externally threaded bolt.

12. A restorable breakaway post according to claim 9 wherein said through slot extends to and forms a channel opening at one side face of said splice plate.

13. A restorable breakaway post according to claim 1 wherein at least one face surface of said breakable splice plate has a fracture groove.

14. A restorable breakaway post according to claim 1 wherein said elongated flexible member comprises a cable.

15. A restorable breakaway post according to claim 1 wherein said third means comprise securement means for securing said one member end portion of said flexible member with respect to said base post and for securing said opposite member end portion of said flexible member with respect to said breakaway post.

16. A restorable breakaway post according to claim 1 wherein said fourth means comprise a first fastener, a second fastener, said first fastener having a higher shear fracture point than said second fastener, said first fastener and said second fastener securing said baseplate with respect to said breakaway post, and said first fastener being spaced at a distance from said second fastener.

17. A restorable breakaway post according to claim 1 wherein said base post is spaced far enough from said breakaway post to create a gap that accommodates a head of a hammer tool.

18. A restorable breakaway post comprising:

a base post:

first means for fixing a position of said base post;

a breakaway post, said breakaway post spaced from said base post;

a breakable splice plate;

second means for securing one plate end portion of said breakable splice plate with respect to said base post and for securing an opposite plate end portion of said breakable splice plate with respect to said breakaway post;

an elongated flexible member;.

third means for securing one member end portion of said flexible member with respect to said base post and for securing an opposite member end portion of said flexible member with respect to said breakaway post; and a baseplate secured with respect to said breakaway post, fourth means for fixedly mounting a structure with respect to said baseplate, and upon an impact force applied to said structure said fourth means allowing said structure to pivot with respect to said baseplate.

19. A restorable breakaway post according to claim 18 wherein said fourth means comprise a first fastener, a second fastener, said first fastener having a higher shear fracture point than said second fastener, said first fastener and said second fastener securing said baseplate with respect to said structure, and said first fastener being spaced at a distance from said second fastener.

* * * * *